Feb. 14, 1950
G. B. LOPER
2,497,835
VARIABLE GAIN VOLTAGE AMPLIFIER
Filed Dec. 20, 1946
2 Sheets-Sheet 1
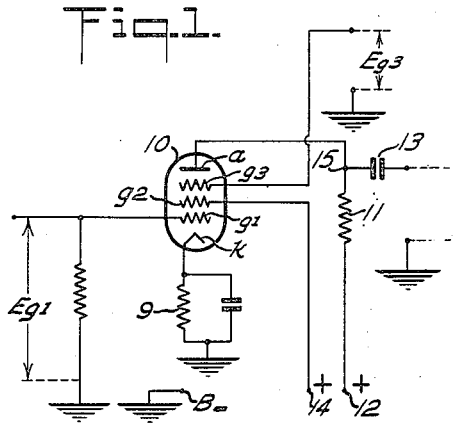
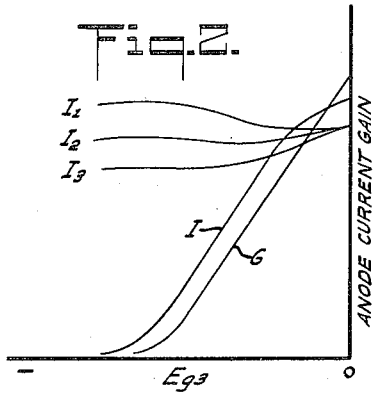
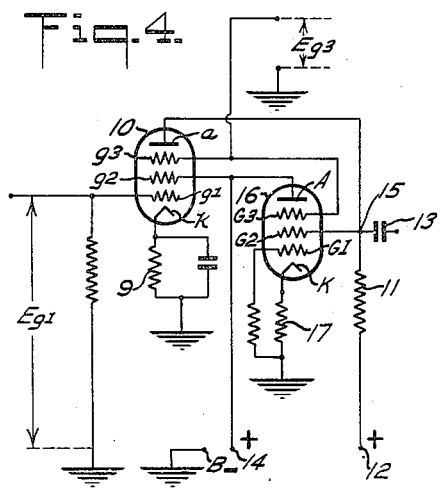
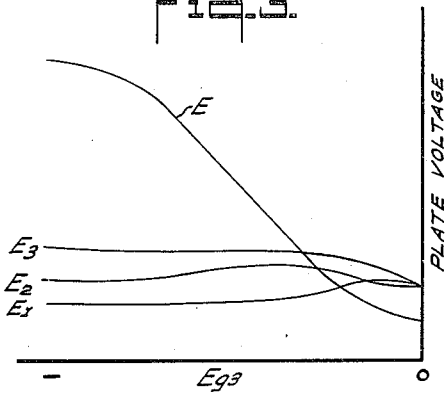
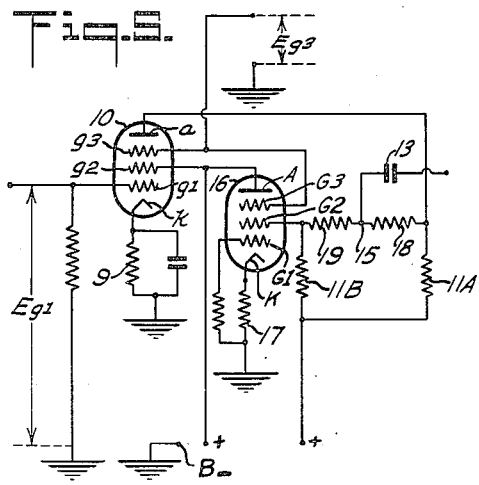
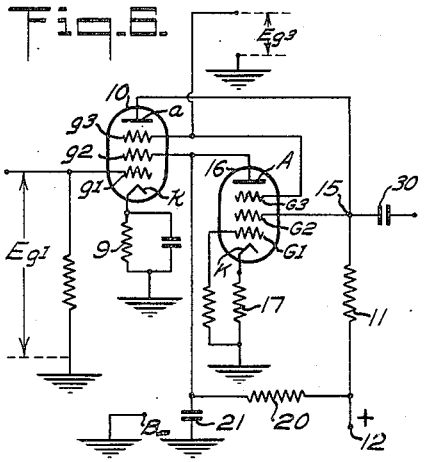
INVENTOR.
GEORGE B. LOPER
BY
Sidney A. Johnson
ATTORNEY

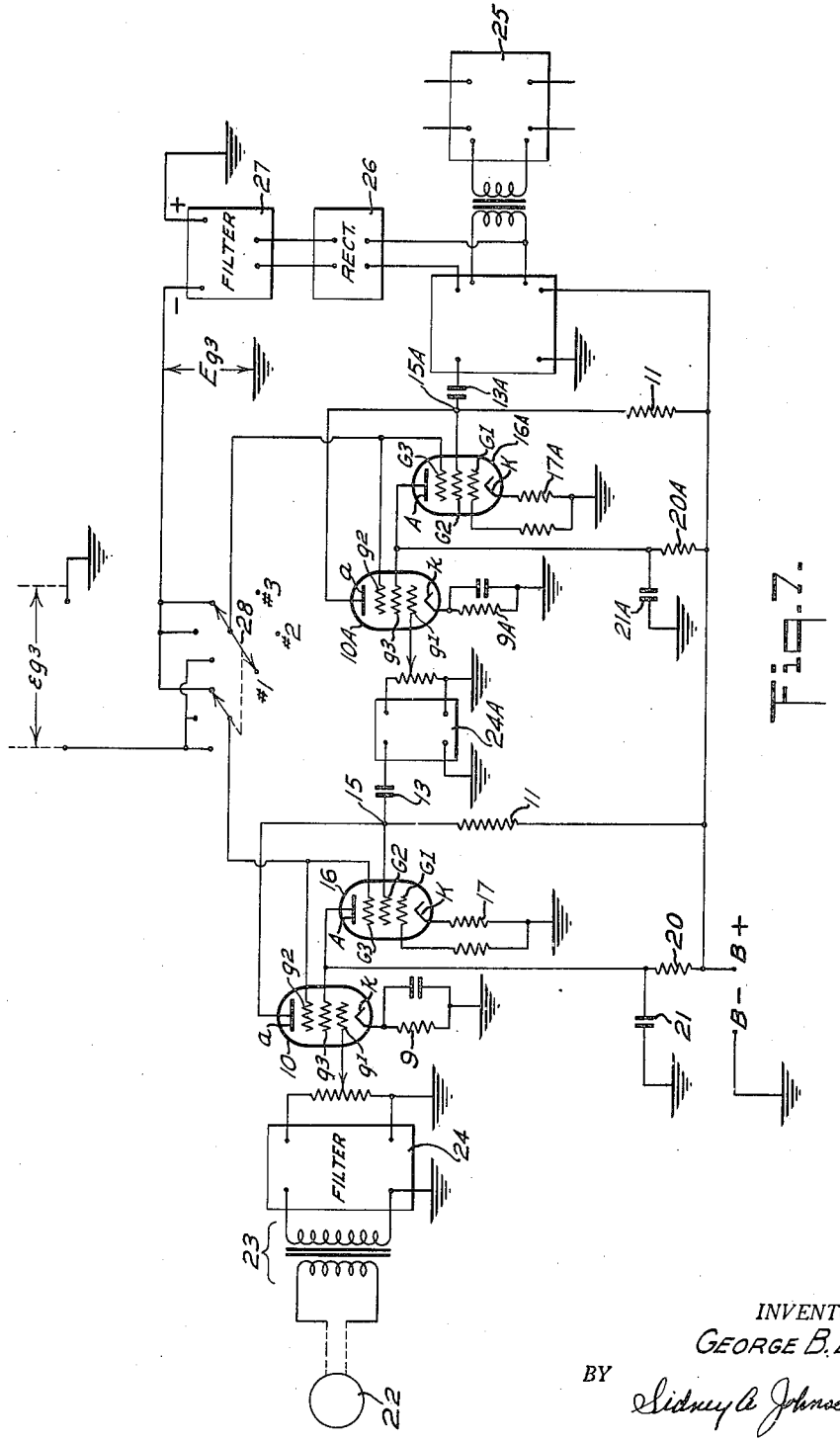

UNITED STATES PATENT OFFICE 2,497,835

VARIABLE GAIN VOLTAGE AMPLIFIER

George B. Loper, Dallas, Tex., assignor, by mesne assignments, to Socony-Vacuum Oil Company, Incorporated, New York, N. Y., a corporation of New York Application December 20, 1946, Serial No. 717,557

1 Claim. (Cl. 179—171)

This invention relates to automatic gain control systems and particularly to automatic gain control systems suited for seismic amplifiers.

In seismic prospecting systems, seismic waves generated by detonation of an explosive charge and reflected from subterraneous strata are converted to electric signals by a spread of geophones connected through amplifiers to a multi-trace oscillograph or equivalent recorder. From the resulting record, a diagram or map of the strata or interface contours may be plotted. For accurate determination of the time intervals, the amplifier gain is initially high so to insure a sharp break in the record indicative of the time of arrival of the first direct traveling waves. Subsequent to reception of the initial direct wave, a series of reflected waves are received from the various subterranean interfaces, the earlier of the reflected waves being of the higher amplitude. To obtain a record in which the traces of the earlier reflected waves do not overlap and in which the traces of later reflected waves are of reasonably large amplitude, the gain of each of the several amplifiers is reduced immediately upon or shortly after reception of the first direct waves and then is increased as a function of time or of the received strength of the signal.

The variations of gain, as effected in previously used amplifier systems, produce spurious signals or modulation effects whose rate of variation with time is of the same order as that of frequencies of seismic wave signals. Consequently, the spurious signals cannot be selectively attenuated by filter circuits, an expedient often employed for that purpose in radio receivers whose automatic gain control voltage is derived by rectification of the relatively high-frequency carrier voltage.

In accordance with the present invention, the gain of an amplifier may be continuously varied over a wide range and at slow or rapid rate preferably in dependence upon the magnitude of the signal being amplified without creating spurious signals of appreciable or disturbing magnitude. More specifically, the gain control voltage is applied to the suppressor grids of two pentode tubes, one serving as the signal amplifier and the other as a stabilizer tube, and the anode and screen grid circuits of the two thermionic tubes are so interconnected that the tendency of the average plate potential of each of the tubes to change with variation of its suppressor grid potential is minimized by the concurrent change of the screen grid potential of the other of the tubes. In effect, by use of the stabilizer tube, the suppressor grid-plate transconductance of the amplifier stage is made closely to approximate or to equal zero throughout the operating range so that variation of the suppressor-grid potential for control of amplification of signals by the amplifier stage does not result in appearance of spurious signals of appreciable magnitude in the amplifier output.

The invention further resides in features of combination and arrangement hereinafter described and claimed.

For more detailed understanding of the invention, reference is made to the accompanying drawings, in which:

Fig. 1 schematically illustrates an amplifier stage of conventional type.

Figs. 2 and 3 are explanatory figures referred to in comparison of operating characteristics of conventional amplifiers and those embodying the invention;

Figs. 4, 5 and 6 schematically illustrate amplifier stages embodying the invention; and Fig. 7 schematically illustrates a geophone amplifier channel.

For more complete understanding of the main source and nature of spurious signals arising in the control of gain of a conventional pentode amplifier stage, reference is made to Fig. 1 in which an alternating signal voltage $Eg1$ to be amplified is applied to the control grid $g1$ of the tube 10. The anode or plate $a$ of the tube is connected through a load impedance, such as resistor 11, to the positive terminal 12 of a suitable source of direct current such as a battery or power supply whose negative terminal (B—) is grounded. The amplified signal voltage across the load resistor 11 may be applied to a subsequent stage or to a translating device through the coupling capacitor 13. The screen grid $g2$ of the tube 10 is connected to the positive terminal 14 of a source of direct current; for convenience terminal 14 may be an intermediate tap of the aforesaid battery or equivalent power supply used to supply the anode current. The suppressor grid $g3$ of tube 10 is connected to a source of direct-current voltage $Eg3$ to be varied for control of the gain of the amplifier stage. The negative biasing voltage for the control grid $g1$ may be and preferably is provided by cathode-resistor 9.

As shown by curve G of Fig. 2, as the potential $Eg3$ of the suppressor grid is made more negative, or less positive, the signal gain is reduced and may in fact be varied over a very wide range. Otherwise stated, the control grid-to-plate transductance of the tube may be decreased by making the potential of the suppressor grid more negative with respect to the cathode of the tube.

However, with this usual amplifier circuit arrangement and as apparent from curve I of Fig. 2, change in magnitude of the suppressor grid voltage $Eg3$ also markedly changes the load current $I$ traversing resistor 11 or other load impedance. Consequently, the load or output current of the conventional amplifier stage, Fig. 1, not only follows the signal voltage $Eg1$ but also undesirably follows the variations of the gain control voltage $Eg3$.

The effect of variations of the gain control voltage $Eg3$ upon the potential of the output coupling point 15 is evident from curve E of Fig. 3: for example, a large and rapid change of the negative suppressor voltage would cause correspondingly large and rapid changes of the positive potential E of the point 15. These changes because not appearing in the impressed voltage $Eg1$ are spurious signals and therefore undesirable components of the amplifier output voltage.

Whether expressed in terms of output current $I$ or of potential $E$ of the coupling point, these spurious signals are not serious when the rate of change of the gain control voltage $Eg3$ corresponds with a frequency which is low compared with the lowest significant frequency of the signal voltage $Eg1$. When all the signal frequencies are low, as in seismic amplifiers, or when some of the signal frequencies are low, as in high-fidelity audio systems, the spurious signals cannot be minimized by frequency-selective networks or filters because their frequency components are of the same order as that of legitimate signals. It is to the solution of this problem that the present invention is directed.

The problem is conventionally solved by use of push-pull circuits, sometimes known as balanced modulators when used in this connection. This method usually calls for relatively large high-fidelity transformers or other additional electronic components not needed in the present invention. Furthermore, the advantage of the single-ended amplifier over the push-pull, where closely associated variable filters and volume controls are to be used, is apparent to those skilled in the art, as filters and volume controls for push-pull are of more involved design and call for more electronic components.

For purpose of direct comparsion, the amplifier stage of Fig. 4, which embodies the present invention, is the same as that of Fig. 1 above discussed except for addition of the stabilizer tube 16 and its connections. The suppressor grid G3 of stabilizer tube 16 is connected to the suppressor grid $g3$ of the signal amplifier tube 10 so that the gain control voltage $Eg3$ is concurrently and similarly effective upon the suppressor grids of both tubes. The anode $a$ of the amplifier tube 10 is connected to the screen grid G2 of the stabilizer tube so that the load current traversing impedance 11 is the algebraic sum of the anode current of tube 10 and the screen grid current of tube 16, and the average direct-current potential of coupling point 15 is jointly determined by the anode current of tube 10 and the screen grid current of tube 16. The screen grid $g2$ of the amplifier tube 10 is connected to the anode A of the stabilizer tube 16. The negative biasing voltage for the control grid G1 of the stabilizer is preferably provided by a resistor 17 connected between cathode K and the chassis or ground.

With the anode and screen grid circuits of tubes 10 and 16 so interconnected, variation of the suppressor voltage $Eg3$ is effective, as described above, to control the signal amplification generally in accordance with curve G of Fig. 2 but the average load current, instead of varying widely in manner indicated by curve I of Fig. 2 and as characteristic of the unstabilized circuit of Fig. 1, remains substantially constant as indicated by any of curves $I_1$, $I_2$, or $I_3$ of Fig. 3. These are typical load-current curves for the stabilized circuit of Fig. 4, the particular shape depending upon the relative values chosen for the cathode resistors 9 and 17 of the two tubes.

Paraphrased in terms of the potential at the coupling point 15, variation of the suppressor voltage $Eg3$ changes the signal gain generally in accordance with curve G of Fig. 2, but the average direct-current potential of the coupling point 15 instead of varying widely in manner indicated by curve E, Fig. 3, and as characteristic of the unstabilized circuit of Fig. 1, remains substantially constant as indicated by any one of curves $E_1$, $E_2$, or $E_3$, Fig. 3. These are typical voltage curves of point 15 for the stabilized circuit of Fig. 4, the particular shape depending upon the selected relative values of the cathode resistors 9 and 17. With the stabilized circuit, the gain control voltage appearing in the anode circuit of the signal amplifier tube 10 is opposed by a corresponding voltage, in the screen circuit of tube 16, which is 180° out of phase. These two voltages substantially balance out with the result, above stated, that the potential of point 15 is substantially independent of variations of gain control voltage $Eg3$.

From consideration of the curves $I_1$, $I_2$, $I_3$ of Fig. 2 or curves $E_1$, $E_2$, $E_3$ of Fig. 3, it is evident the gain of the amplifier stage as far as variations of voltage $Eg3$, the suppressor voltage, are concerned is very low and in fact is zero or nearly so throughout the range for which the suppressor grid voltage is varied substantially to change the gain of the stage for the signal voltage $Eg1$. Otherwise stated, the control grid-plate transconductance of the stage can be varied over a wide range by variation of the suppressor grid voltage $Eg3$ but because of the aforesaid interconnection of the anodes and screen grids of the tubes the suppressor grid-plate transconductance is and remains negligible, so greatly minimizing or avoiding spurious signals otherwise inherently arising from the variations of the suppressor grid voltage. By way of example, the following parameters are given:

Resistor 11: 250,000 ohms.
Resistor 9: 2,500 ohms
Resistor 17: 2,500 ohms
Tubes 10 and 16: 6J7, 6K7 6W7, 6SS7 type
D. C. voltages:
  +12 to B—: 90 volts
  +14 to B—: 22½ volts The circuit shown in Fig. 5 is fundamentally the same as that of Fig. 4 and accordingly the above discussion concerning avoidance of spurious signals directly applies. In this modification, the plate circuit of the signal amplifier tube 10 and the screen grid circuit of the stabilizer tube 16 are effectively decoupled by use of a balanced bridge of the four-impedance type which includes separate load resistors 11A and 11B connected repectively in adjacent arms of the bridge and to the coupling point 15 by bridge resistors 18 and 19 of suitable magnitude; for example, 100,000 ohms. With this method the potential of screen G2 will vary, and so also will the potential of plate $a$ vary, but the variations at the screen-plate diagonal of the bridge will be 180° out of phase and the potential at point 15 will be substantially constant with respect to changes of $Eg3$. This method affords a means of attaining optimum constancy of the potential at 15 by careful selection of resistors 18 and 19.

The circuit shown in Fig. 6 is basically the same as that of Fig. 4, differing only in that the screen grid $g2$ of the tube 10 and the anode A of tube 16 obtain their operating voltage through a series resistor 20 connected to the positive terminal 12 of the power supply rather than from an intermediate tap 14 of the battery or other power supply. To avoid undesirable feedback from the anode A to screen grid $g2$, there should be provided a large bypass condenser 21, having for example a capacity of 20 microfarads. This method of providing the screen grid voltage is practical with the stabilized circuit because the anode circuit of the tube 16 regulates the voltage of the screen grid of the amplifier tube whereas in the conventional circuit, Fig. 1, the series resistor method of obtaining the operating voltage for screen grid $g2$ would not be satisfactory because the screen grid voltage would vary substantially with variations of the suppressor grid voltage and so change the operating conditions of the tube to produce or enhance distortion of the signal.

In Fig. 7 there is shown a seismic signal amplifier embodying two stabilized amplifier stages each generically similar to those of Figs. 4–6 and specifically the same as that of Fig. 6. In brief, a seismic wave detector or geophone 22 is coupled by transformer 23 or equivalent to the control grid circuit of the first amplifier tube 10. A filter network 24 is preferably included selectively to pass the seismic signal frequencies which lie in the range of from about twenty to about eighty cycles and markedly to attenuate frequencies which are outside of that range: the frequency characteristics of these filters may remain fixed during a recording run or may vary automatically as disclosed in co-pending application, Serial No. 679,991 of John P. Minton.

The output of the first stage comprising the signal amplifier tube 10 and its stabilizer tube 16 is coupled to the control grid circuit of the second signal amplifier tube 10A preferably through a second filter network 24A also suited to favor signals in the seismic frequency range. The output of the second stage comprising the signal amplifier tube 10A and its stabilizer tube 16A may be coupled to a conventional output amplifier stage. This is in turn coupled in usual manner to a multi-trace oscillograph recorder 25 and to a rectifier 26 which derives from the amplified geophone signal a direct-current voltage whose magnitude is a function of the signal amplitude and which may be utilized automatically to control the gain of one or more of the amplifier stages. A preferred and satisfactory amplifier-rectifier arrangement for deriving control voltage $Eg3$ is disclosed in my co-pending application, Serial No. 585,095. The filter 27 reduces the ripple-frequency component of the direct-current output of rectifier 26: the time constant of this filter network may be fixed at low value to insure rapid reduction of gain upon arrival of the first direct waves at the geophone or the time constant may be automatically varied as disclosed in co-pending application, Serial No. 708,331 of William B. Hemphill. In any event, the desired rate of change of the automatic gain control voltage $Eg3$ may be such that except for the stabilizing action of tubes 16 and 16A, spurious signals would appear in the output of the amplifier tubes 10, 10A and these signals, because having frequency components similar to those of the geophone signals, would be passed by the filter 24A and coupling condensers 13 and 13A and ultimately appear in the recorder trace as a component which interferes with recognition of the legitimate signals. With the stabilizer tubes, however, change of the gain control voltage $Eg3$ produces no spurious signals of any consequence regardless of whether the gain control voltage be changed slowly or rapidly. Therefore, the record of the signals produced by recorder 25, or equivalent, represents the seismic wave signals substantially free of distortion or masking by spurious signals incident to the automatic gain control action.

With the switch 28 in the #2 position, the automatic gain control voltage $Eg3$ is applied to control the gain of one of the stabilized stages and the gain of the other stabilized stage is determined by voltage $eg3$ which may be varied or preset by an operator at the master control station for a spread of geophones or which may be varied automatically as a function of time during the interval following a shot generally as disclosed in U. S. Letters Patent 2,408,001 to Shimek et al. With the switch 28 in the #1 position, the gains of both stages of the amplifier for geophone 22 are controlled by variation of aforesaid voltage $eg3$. For reasons discussed in explanation of the basic circuits, Figs. 4–6, the variations of the gain control voltages $Eg3$ and $eg3$ do not appear as spurious signals in the output of the geophone amplifier channel because of the stabilizing action of tubes 16 and 16A.

It shall be understood the invention is not limited to the particular arrangements specifically described but that changes and modifications within the scope of the appended claim may be made.

What is claimed is:

A variable gain amplifier stage for maintaining seismic signals at desired amplitude without producing spurious signals, which comprises two pentode tubes, a source of seismic signals connected to the control grid of a first of said tubes to vary the control grid-anode transconductance of said first tube, said first tube having an output circuit including a balanced bridge of the four-impedance type, the anode of said first tube and the screen grid of the second of said tubes being connected across a diagonal of said balanced bridge, an amplifier output circuit including a capacitor connected to the other diagonal of said balanced bridge, a source of B-supply for the anode of said first tube and for said screen grid of said second tube connected between their respective cathodes and to said last-named diagonal on the side of said bridge opposite said capacitor, a conductive connection between the screen grid of said first tube and the anode of said second tube, a conductive connection between the suppressor grids of said tubes, and means for deriving from said amplifier output circuit a gain control voltage including a gain control circuit connected to said suppressor grids to vary the suppressor grid-anode transconductance of both of said pentodes, the circuit components of said bridge being selected for continuous balance thereof upon change in suppressor grid-anode transconductance of said first tube and upon concurrent opposite and proportionate change in suppressor grid-screen grid transconductance of said second tube.

GEORGE B. LOPER.

REFERENCES CITED

The following references are of record in the file of this patent:

UNITED STATES PATENTS

| Number | Name | Date |
|---|---|---|
| 2,360,466 | Bedford et al. | Oct. 17, 1944 |